(12) United States Patent
Ansari et al.

(10) Patent No.: US 11,722,865 B2
(45) Date of Patent: Aug. 8, 2023

(54) VEHICLE-TO-EVERYTHING (V2X) INFORMATION VERIFICATION FOR MISBEHAVIOR DETECTION

(71) Applicant: QUALCOMM Incorporated, San Diego, CA (US)

(72) Inventors: Mohammad Raashid Ansari, Lowell, MA (US); Jean-Philippe Monteuuis, Shrewsbury, MA (US); Jonathan Petit, Wenham, MA (US); Cong Chen, Shrewsbury, MA (US)

(73) Assignee: QUALCOMM Incorporated, San Diego, CA (US)

( * ) Notice: Subject to any disclaimer, the term of this patent is extended or adjusted under 35 U.S.C. 154(b) by 148 days.

(21) Appl. No.: 17/498,116

(22) Filed: Oct. 11, 2021

(65) Prior Publication Data

US 2023/0114203 A1    Apr. 13, 2023

(51) Int. Cl.
*H04W 4/40* (2018.01)
*H04W 12/106* (2021.01)

(52) U.S. Cl.
CPC ........... *H04W 4/40* (2018.02); *H04W 12/106* (2021.01)

(58) Field of Classification Search
CPC ....... H04W 4/40; H04W 12/122; H04W 4/44; H04W 12/08; H04W 4/38; H04W 12/106
See application file for complete search history.

(56) References Cited

U.S. PATENT DOCUMENTS

| | | | | |
|---|---|---|---|---|
| 11,553,346 | B2* | 1/2023 | Yang | G08G 1/166 |
| 11,586,213 | B2* | 2/2023 | Refaat | G05D 1/0088 |
| 11,632,253 | B2* | 4/2023 | Barrett | H04W 4/44 |
| | | | | 713/156 |
| 2014/0140353 | A1 | 5/2014 | Stahlin et al. | |
| 2016/0119151 | A1* | 4/2016 | Park | H04W 12/043 |
| | | | | 713/158 |
| 2016/0140842 | A1* | 5/2016 | Park | G08G 1/0112 |
| | | | | 340/905 |
| 2016/0323741 | A1* | 11/2016 | Lee | H04W 12/06 |
| 2019/0130762 | A1* | 5/2019 | Yang | G08G 1/163 |
| 2020/0143053 | A1* | 5/2020 | Gutierrez | G06F 21/554 |
| 2020/0145433 | A1* | 5/2020 | Gutierrez | G06N 3/08 |
| 2022/0368617 | A1* | 11/2022 | Xin | H04L 41/5067 |

(Continued)

OTHER PUBLICATIONS

Muhammad et al., "A survey of local/cooperative-based malicious information detection techniques in VANETs", published Mar. 15, 2018 (Year: 2018).*

(Continued)

*Primary Examiner* — Dung Hong
(74) *Attorney, Agent, or Firm* — The Marbury Law Group, PLLC

(57) ABSTRACT

Various embodiments include method performed by a processor of a vehicle processing system for misbehavior detection, including receiving first vehicle-to-everything (V2X) information from a first vehicle, receiving second V2X information from neighbor vehicles of the first vehicle, determining a distribution of information in the second V2X information, and performing a security action in response to determining that information in the first V2X information is outside a confidence threshold of the distribution of information in the second V2X information.

27 Claims, 10 Drawing Sheets

(56) References Cited

U.S. PATENT DOCUMENTS

2023/0063601 A1* 3/2023 Upadhyay .............. G07C 5/006

OTHER PUBLICATIONS

Arshad M., et al., "A Survey of Local/Cooperative-based Malicious Information Detection Techniques in VANETs", EURASIP Journal on Wireless Communications and Networking, Biomed Central Ltd, London, UK, vol. 2018, No. 1, Mar. 15, 2018, 17 pages, XP021254470, DOI:10.1186/813638-018-1064-Y, Abstract p. 1, Paragraph 1-Paragraph 2, p. 2, Paragraph 3—p. 5, Paragraph 5.2, p. 7, Paragraph 6—p. 10, Paragraph 6.3.

Intel Corporation (UK) Ltd: "Proposed Additions to Different Sections of the Draft TR 103 460", ITSWG5 (20) 054010, European Telecommunications Standards Institute, 650, Route Des Lucioles, F-06921 Sophia-Antipolis, France, vol. WG ITS WG5 Security, Jan. 8, 2020, pp. 1-32, XP014359849, p. 5, Para 1—p. 10, Para 4.3, p. 11, Para 8.1—p. 18, Para 5.4, p. 20, Para 6.2—p. 23, Para 7.1.

International Search Report and Written Opinion—PCT/US2022/042397—ISA/EPO—dated Dec. 1, 2022.

* cited by examiner

Example protocol stack and related core standards for C-ITS in Europe

VEHICLE-TO-EVERYTHING (V2X) INFORMATION VERIFICATION FOR MISBEHAVIOR DETECTION

BACKGROUND

Standards and protocols are under development for an Intelligent Transportation System (ITS) supported by next-generation 5G NR communication systems. Appropriately configured devices of vehicles and pedestrians can participate in the ITS by sending and receiving Vehicle-to-Everything (V2X) messages, such as Basic Safety Messages, that include information about the ITS participant's current and/or upcoming behavior, enabling other ITS participants to operate more safely. Given the important safety role of V2X messages, it is important to ensure the validity and accuracy of V2X messages.

SUMMARY

Various aspects include methods of misbehavior detection performed by a vehicle processing system, such as a vehicle-to-everything (V2X) processing device. Various aspects may include receiving first vehicle-to-everything (V2X) information from a first vehicle, receiving second V2X information from neighbor vehicles of the first vehicle, determining a distribution of information in the second V2X information, and performing a security action in response to determining that information in the first V2X information is outside a confidence threshold of the distribution of information in the second V2X information.

Some aspects may include selecting V2X information from among the second V2X information that is received from neighbor vehicles that are within a threshold distance from the first vehicle. In such aspects, determining the distribution of information in the second V2X information may include determining a distribution of information in the selected V2X information. Some aspects may include adjusting the threshold distance used in selecting V2X information from among the second V2X information received from neighbor vehicles to include a threshold number of neighbor vehicles.

In some aspects, selecting V2X information from among the received second V2X information that is received from neighbor vehicles that are within a threshold distance from the first vehicle may include selecting V2X information from among the second V2X information that is received from neighbor vehicles based on headings of the neighbor vehicles. Some aspects may include dynamically determining the confidence threshold of the distribution of information for at least one field based on one or more of a variance among the first V2X information and the second V2X information for at least one field, the threshold distance from the first vehicle, or a value of a time threshold.

In some aspects, determining a distribution of information in the second V2X information may include determining a respective distribution of information from each of a plurality of fields in the second V2X information. In such aspects, performing a security action in response to determining that information in the first V2X information is outside a confidence threshold of the distribution of information in the second V2X information may include performing a security action in response to determining that information in the plurality of fields of the first V2X information is outside a confidence threshold of respective distributions of information in the second V2X information.

In some aspects, the plurality of fields in the second V2X information each may include kinematic values for each of the respective vehicles.

In some aspects, performing a security action in response to information in the plurality of fields of the first V2X information is outside a confidence threshold of respective distributions of information in the second V2X information may include performing a security action in response to determining that information in at least one field in the first V2X information is outside a confidence threshold of the distribution of information for a corresponding at least one field and that a value of the confidence threshold meets a confidence reliability threshold. Some aspects may include receiving from a roadside unit (RSU) information about neighbor vehicles that do not transmit V2X information, and including the information about neighbor vehicles that do not transmit V2X information received from the RSU in the second V2X information to determine a distribution of a combination of information in the second V2X information and information about neighbor vehicles received from the RSU. Some aspects may include selecting V2X information from among the received second V2X information that is received from neighbor vehicles that meets a time threshold. In such aspects, determining the distribution of information in the second V2X information may include determining the distribution of information in the selected V2X information.

Further aspects include a vehicle processing system including a memory and a processor configured to perform operations of any of the methods summarized above. Further aspects may include a vehicle processing system having various means for performing functions corresponding to any of the methods summarized above. Further aspects may include a non-transitory processor-readable storage medium having stored thereon processor-executable instructions configured to cause a processor of a vehicle processing system to perform various operations corresponding to any of the methods summarized above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

DETAILED DESCRIPTION

Figure 1A:
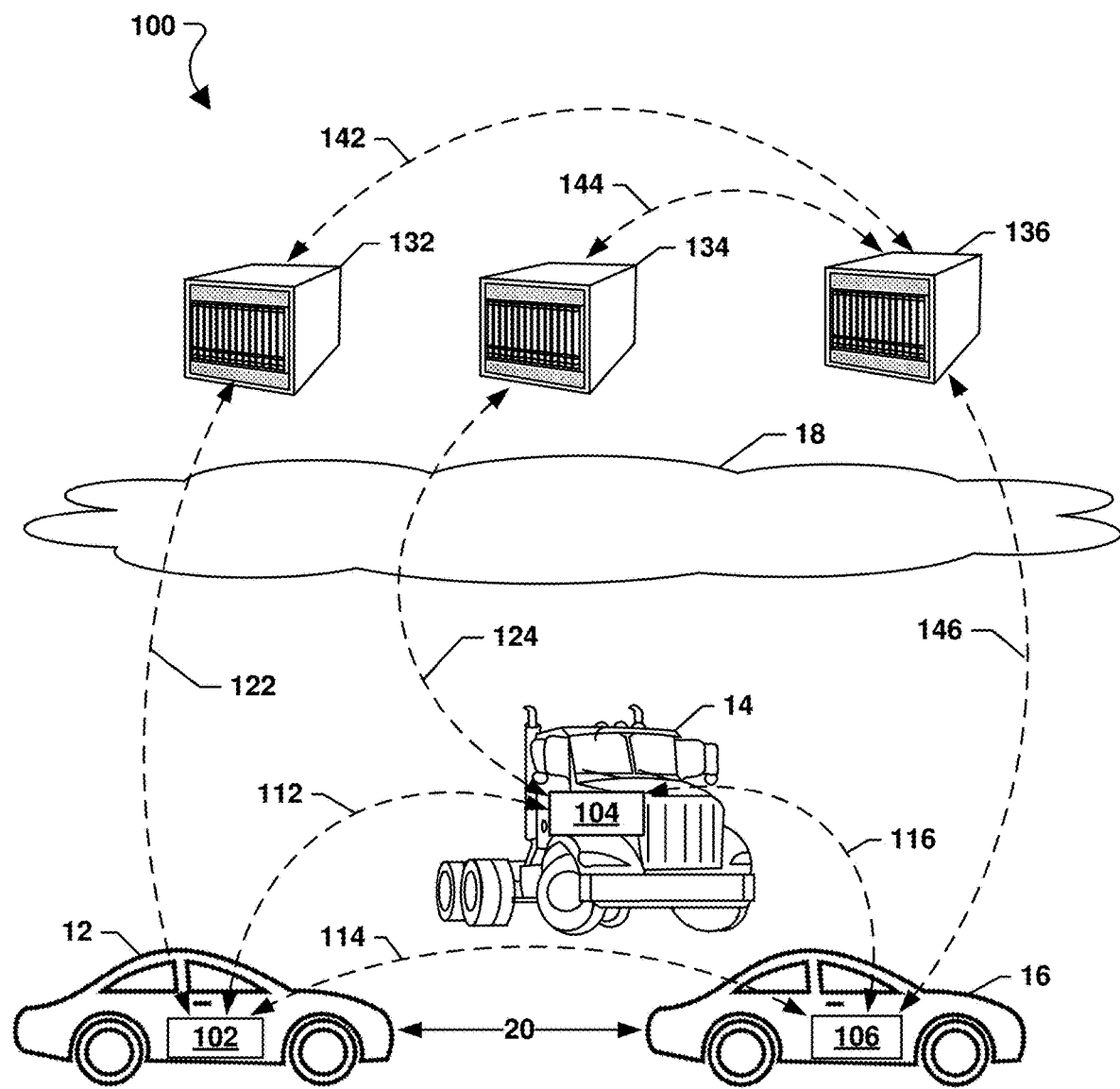
FIG. 1A is a system block diagram illustrating an example V2X system suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods and mechanisms for detecting misbehavior of an intelligent transportation system (ITS) participant. Various embodiments enable a vehicle processing system (e.g., a V2X processing device, such as in V2X onboard equipment) to verify information in a V2X message transmitted by a first vehicle by also receiving V2X information from neighbor vehicles of the first vehicle, and determining whether the information received from the first vehicle is consistent with the information received from the neighbor vehicles. The vehicle processing system may verify the information in V2X message if it is consistent, and may treat information in the V2X message as inaccurate or as V2X misbehavior if the information in the V2X message is not consistent with the information received from the neighbor vehicles of the first vehicle.

As used herein, "vehicle" refers generally to a sender and/or receiver of V2X messages in an ITS, for example, a car, truck, bus, train, boat, pedestrian, bicycle, motorcycle, scooter, any other type of ITS station, or any other suitable ITS participant type.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), Institute of Electrical and Electronics Engineers (IEEE) 802.11 (Wi-Fi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in various examples.

Standards are being developed in multiple regions of the world for vehicle-based communication systems and functionality, such as the standards developed in Institute of IEEE and Society of Automotive Engineers (SAE) for use in North America, or in European Telecommunications Standards Institute (ETSI) and European Committee for Standardization (CEN) for use in Europe. The IEEE 802.11p standard is the basis for the Dedicated Short Range Communication (DSRC) and ITS-G5 communication standards. IEEE 1609 is a higher layer standard based on IEEE 802.11p. The Cellular Vehicle-to-Everything (C-V2X) standard is a competing standard developed under the auspices of the 3rd Generation Partnership Project. These standards serve as the foundation for vehicle-based wireless communications, and may be used to support intelligent highways, autonomous and semi-autonomous vehicles, and improve the overall efficiency and safety of the highway transportation systems. Other V2X wireless technologies are also under consideration in different regions of the world. The techniques described herein are applicable to any V2X wireless technology.

The C-V2X protocol defines two transmission modes that, together, provide a 360° non-line-of-sight awareness and a higher level of predictability for enhanced road safety and autonomous driving. A first transmission mode includes direct C-V2X, which includes vehicle-to-vehicle (V2V), vehicle-to-infrastructure (V2I), and vehicle-to-pedestrian (V2P), and that provides enhanced communication range and reliability in the dedicated Intelligent Transportation System (ITS) 5.9 gigahertz (GHz) spectrum that is independent of a cellular network. A second transmission mode includes vehicle-to-network communications (V2N) in mobile broadband systems and technologies, such as third generation wireless mobile communication technologies (3G) (e.g., global system for mobile communications (GSM) evolution (EDGE) systems, code division multiple access (CDMA) 2000 systems, etc.), fourth generation wireless mobile communication technologies (4G) (e.g., long term evolution (LTE) systems, LTE-Advanced systems, mobile Worldwide Interoperability for Microwave Access (mobile WiMAX) systems, etc.), fifth generation new radio wireless mobile communication technologies (5G NR systems, etc.), etc.

The processing of such messages in the transmitting and receiving vehicles may be performed by a processor or processing system of onboard equipment that provides the vehicle-to-everything (V2X) functionality (referred to herein as a "vehicle processing system").

V2X systems and technologies hold great promise for improving traffic flows and vehicle safety by enabling vehicles to share information regarding their location, speed, direction of travel, braking, and other factors that may be useful to other vehicles for anti-collision and other safety functions. An element of V2X systems is the ability for a vehicle to broadcast V2X information in a V2X message, such as a Basic Safety Messages (BSM) or a Cooperative Awareness Messages (CAM) in Europe, which other vehicles can receive and process to improve traffic safety. A vehicle may transmit a V2X message frequently, in some implementations up to 20 times per second. With most or all vehicles transmitting V2X information, receiving vehicles may receive information from other vehicles to control their own speed, direction, maneuvering, path planning, etc. to avoid collisions and efficiently and safely position vehicles with respect to each other. Further, V2X equipped vehicles may improve traffic flow by safely reducing separation distances, platooning several vehicles together, and avoiding vehicles experiencing breakdowns.

In V2X communications, it is important that inaccurate, corrupted, or intentionally falsified data is detected and mitigated. However, as an increasing number of ITS participants are equipped to participate in such networks, the volume of potentially inaccurate, corrupted, or intentionally falsified information (sometimes referred to herein as "misbehavior") is large and growing at an exponential rate. For example, a misbehaving ITS participant that is a car may send a V2X message that inaccurately declares that the car has the dimensions of a bus, in order to fool other nearby ITS participants into staying further away from the car. As another example, a misbehaving ITS participant may inaccurately indicate that the width of the ITS participant occupies most of the road width, so that other vehicles do not attempt to pass the ITS participant. As yet another example, a misbehaving ITS participant (e.g., a scooter) may indicate that it is a pedestrian type of ITS participant in order to drive on a sidewalk without triggering a system alert or alarm, e.g., an alert sent to the police. Further, a faulty vehicle sensor or processing errors may provide inaccurate V2X information. Such misbehavior by ITS participants, whether the result of malfunctioning equipment or an intentional attack, can reduce the efficiency of the ITS, and in some cases place human health and safety at risk.

Some methods of detecting V2X messages that include inaccurate or spurious information involve detecting inconsistencies in the V2X message itself. For example, a receiving device may determine that a V2X message from a sending device includes information that the ITS participant is a motorcycle, and that the motorcycle is two meters wide. However, a smart attacker could generate false V2X messages that include information that is both inaccurate and consistent.

Various embodiments include methods and processors of vehicle processing devices and systems configured to perform the methods for misbehavior detection in V2X information. Various embodiments enable a vehicle processing system to receive first V2X information from a first vehicle, and to receive second V2X information from neighbor vehicles of the first vehicle. In some embodiments, the vehicle processing system may determine a distribution of information in the second V2X information. In some embodiments, in response to determining that information in the first V2X information is outside a confidence threshold of the distribution of information in the second V2X information, the vehicle processing system may perform a security action.

In some embodiments, the vehicle processing system may select V2X information from among the second V2X information that is received from neighbor vehicles that are within a threshold distance from the first vehicle. In various embodiments, the vehicle processing system may filter the information received from neighbor vehicles to obtain V2X information that is relevant to verifying the first V2X information. In some embodiments, the vehicle processing system may adjust the threshold distance used in selecting V2X information from among the second V2X information received from neighbor vehicles to include a threshold number of neighbor vehicles. In some embodiments, the vehicle processing system may select V2X information from among the second V2X information that is received from neighbor vehicles that are within a threshold distance from the first vehicle may include selecting information received from neighbor vehicles based on headings of the neighbor vehicles.

In some embodiments, the vehicle processing system may receive from a roadside unit (RSU) information about neighbor vehicles that do not transmit V2X information, and use such information together with the V2X information received from neighbor vehicles. In some embodiments, the vehicle processing system may select information received from neighbor vehicles that meets a time threshold. In some embodiments, the vehicle processing system may select (or adjust) the time threshold based on traffic density or traffic speed. In this manner, the vehicle processing system may select (or adjust) the time threshold to include V2X information from neighbor vehicles that is accurate and relevant to the evaluation of the V2X information from the first vehicle.

In some embodiments, the vehicle processing system may determine the distribution of information in the selected second V2X information. In some embodiments, the vehicle processing system may determine the distribution using a combination of information in the second V2X information and information about neighbor vehicles received from the RSU. In some embodiments, the vehicle processing system may determine a separate distribution of information for one or more of a plurality of fields within the second V2X information. In some embodiments, the plurality of fields in the second V2X information each includes kinematic values for each of the respective vehicles. In various embodiments, such kinematic values may include, for example, speed, location, acceleration, heading, braking, yaw rate, and/or other suitable kinematic values.

In some embodiments, the vehicle processing system may dynamically determine the confidence threshold for the distribution of information (or for the distributions of information of each of one or more fields of the V2X information). In some embodiments, the vehicle processing system may dynamically determine the confidence threshold(s) of the distribution(s) based on one or more of a variance among the first V2X information and the second V2X information for at least one field, the threshold distance from the first vehicle, and/or the value of the time threshold.

In various embodiments, the vehicle processing system may perform a security action in response to determining that information in the first V2X information is outside a confidence threshold of the distribution of information in the second V2X information. For example, the vehicle processing system may transmit a misbehavior report about the first vehicle to an ITS network element, such as a security server, or to a network element performing a similar or suitable function, to an RSU, and/or to one or more other vehicles.

Various embodiments may improve the operations of a vehicle processing system by enabling detection of V2X misbehavior as well as enable mitigation of detected inaccurate or spurious information. Various embodiments may improve the operations of an ITS or V2X network by improving the accuracy of information in the ITS by decreasing the transmission of inaccurate V2X information. Various embodiments may improve ITS safety by enabling ITS participants (such as V2X equipped vehicles) to avoid taking actions in response to inaccurate or implausible information in received V2X messages.

For ease of reference, some of the embodiments are described in this application with reference to a vehicle using a particular V2X system, device, and/or and protocol. However, it should be understood that various embodiments encompass any or all of the V2X or vehicle-based communication standards, devices, messages, protocols, and/or technologies. As such, nothing in the application should be construed to limit the claims to a particular system (e.g., V2X) or message or messaging protocol (e.g., BSM or CAM) unless expressly recited as such in the claims. In addition, the embodiments described herein may refer to a V2X processing system in a vehicle. Other embodiments are contemplated in which the V2X processing system may operate in or be included in mobile devices, mobile computers, roadside units (RSUs), and other devices that are equipped to monitor road and vehicle conditions and to participate in V2X communications.

Figure 1B:
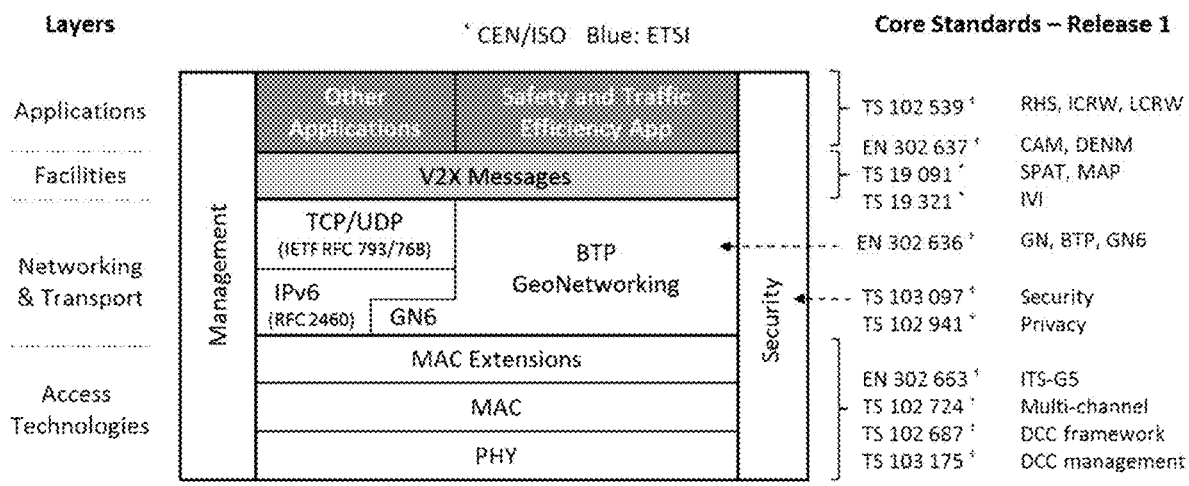
FIG. 1B is a conceptual diagram illustrating an example V2X communication protocol stack suitable for implementing various embodiments.

FIG. 1A is a system block diagram illustrating an example V2X system 100 suitable for implementing various embodiments. FIG. 1B is a conceptual diagram illustrating an example V2X communication protocol stack 150 suitable for implementing various embodiments. With reference to FIGS. 1A and 1B, a vehicle 12, 14, 16 may include vehicle processing system 102, 104, 106, respectively (e.g., a V2X processing device, such as in V2X onboard equipment), that may be configured to periodically broadcast V2X messages (e.g., BSM, CAM) 112, 114, 116 for receipt and processing by other vehicles' processing systems (e.g., 102, 104, 106).

By sharing the vehicle location, speed, direction, behavior such as braking, and other information, vehicles can maintain safe separation and identify and avoid potential collisions. For example, a trailing vehicle 12 receiving V2X messages 114 from a leading vehicle 16 can determine the speed and location of the vehicle 16, enabling vehicle 12 to match the speed and maintain a safe separation distance 20. By being informed through V2X messages 114 when the leading vehicles 16 applies the brakes, the vehicle processing system 102 in the trailing vehicle 12 can apply brakes simultaneously to maintain the safe separation distance 20 even when the leading vehicle 16 stops suddenly. As another example, the vehicle processing system 104 within the truck vehicle 14 may receive V2X messages 112, 116 from the two vehicles 12, 16, and thus be informed that the truck vehicle 14 should stop at an intersection to avoid a collision. Further, each of the vehicle processing systems 102, 104, 106 may communicate with one another using any of a variety close proximity communication protocols.

In addition, the vehicles may be able to transmit data and information regarding V2X messages to a variety of network elements 132, 134, 136 via communication links 122, 124, 146 through a communication network 18 (e.g., V2X, cellular, Wi-Fi, etc.) For example, network element 132 may be incorporated into, or may be in communication with, an RSU, a gantry unit, and/or the like. The network element 134, 136 may be configured to perform a function or service related to a vehicle 12, 14, 16, such as payment processing, road condition monitoring, emergency provider message handling, and the like. The network element 134, 136 may be configured to communicate with one another through wired or wireless networks 142, 144 to exchanging information associated with payment processing, road condition monitoring, emergency provider message handling, and similar services.

Figure 2:
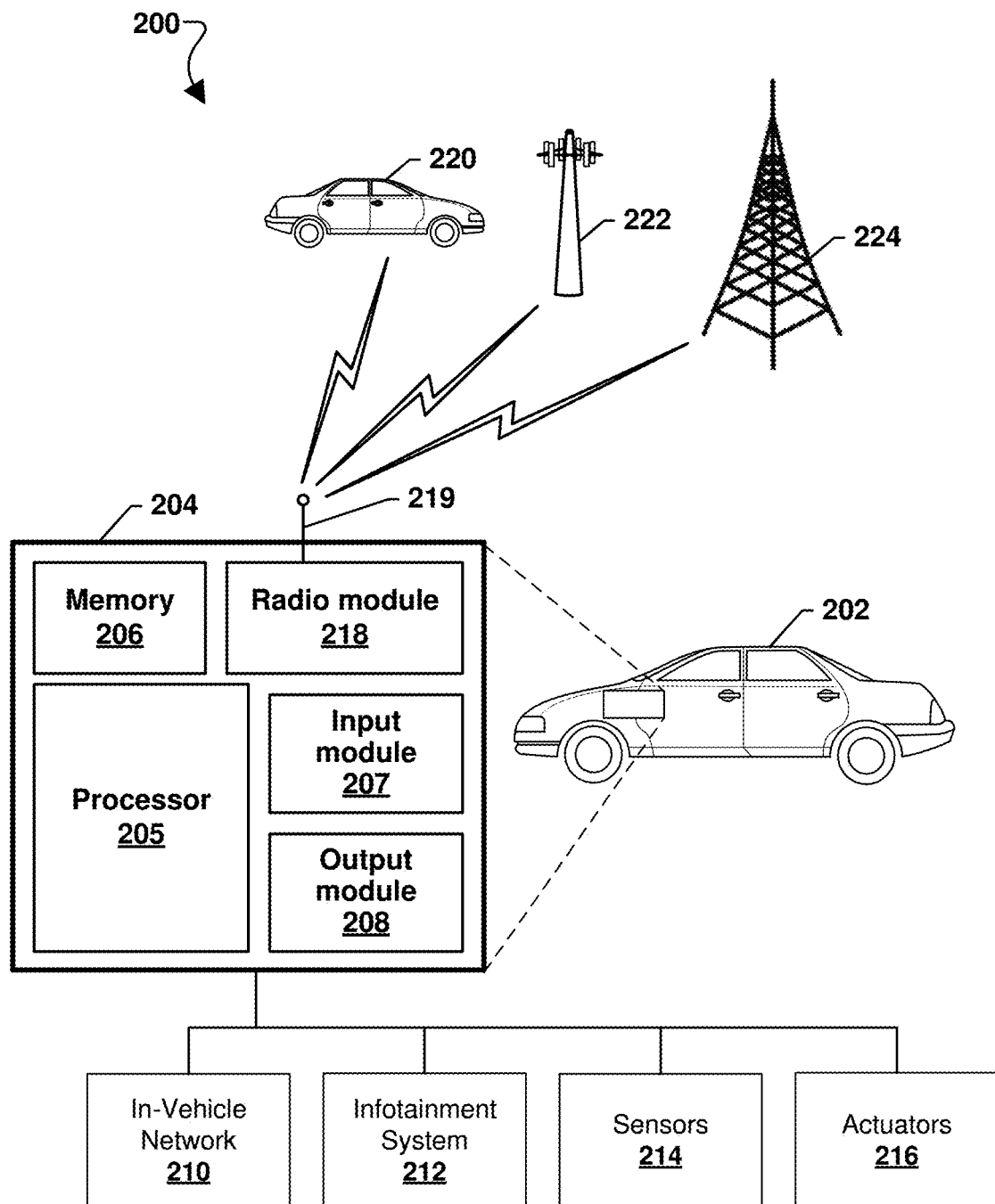
FIG. 2 is a component diagram of an example vehicle system suitable for implementing various embodiments.

FIG. 2 is a component diagram of an example vehicle system 200 suitable for implementing various embodiments. With reference to FIGS. 1A-2, the system 200 may include a vehicle 202 that includes a vehicle processing system 204, for example, a V2X processing device, such as a telematics control unit or on-board unit (TCU/OBU). The vehicle processing system 202 may communicate with various systems and devices, such as an in-vehicle network 210, an infotainment system 212, various sensors 214, various actuators 216, and a radio module 218. The vehicle processing system 202 also may communicate with various other vehicles 220, roadside units 222, base stations 224, and other external devices. The vehicle processing system 204 may be configured to perform operations for misbehavior detection as further described below.

The vehicle processing system 204 may include a processor 205, memory 206, an input module 207, an output module 208 and the radio module 218. The processor 205 may be coupled to the memory 206 (i.e., a non-transitory storage medium), and may be configured with processor-executable instructions stored in the memory 206 to perform operations of the methods according to various embodiments described herein. Also, the processor 205 may be coupled to the output module 208, which may control in-vehicle displays, and to the input module 207 to receive information from vehicle sensors as well as driver inputs.

The vehicle processing system 204 may include a V2X antenna 219 coupled to the radio module 218 that is configured to communicate with one or more ITS participants (e.g., stations) such as another vehicle 220, a roadside unit 222, and a base station 224 or another suitable network access point. In various embodiments, the vehicle processing system 204 may receive information from a plurality of information sources, such as the in-vehicle network 210, infotainment system 212, various sensors 214, various actuators 216, and the radio module 218. The vehicle processing system 204 may be configured to detect misbehavior in a V2X message from an ITS participant (e.g., another vehicle), as further described below.

Examples of an in-vehicle network 210 include a Controller Area Network (CAN), a Local Interconnect Network (LIN), a network using the FlexRay protocol, a Media Oriented Systems Transport (MOST) network, and an Automotive Ethernet network. Examples of vehicle sensors 214 include a location determining system (such as a Global Navigation Satellite Systems (GNSS) system, a camera, radar, lidar, ultrasonic sensors, infrared sensors, and other suitable sensor devices and systems. Examples of vehicle actuators 216 include various physical control systems such as for steering, brakes, engine operation, lights, directional signals, and the like.

Figure 3:
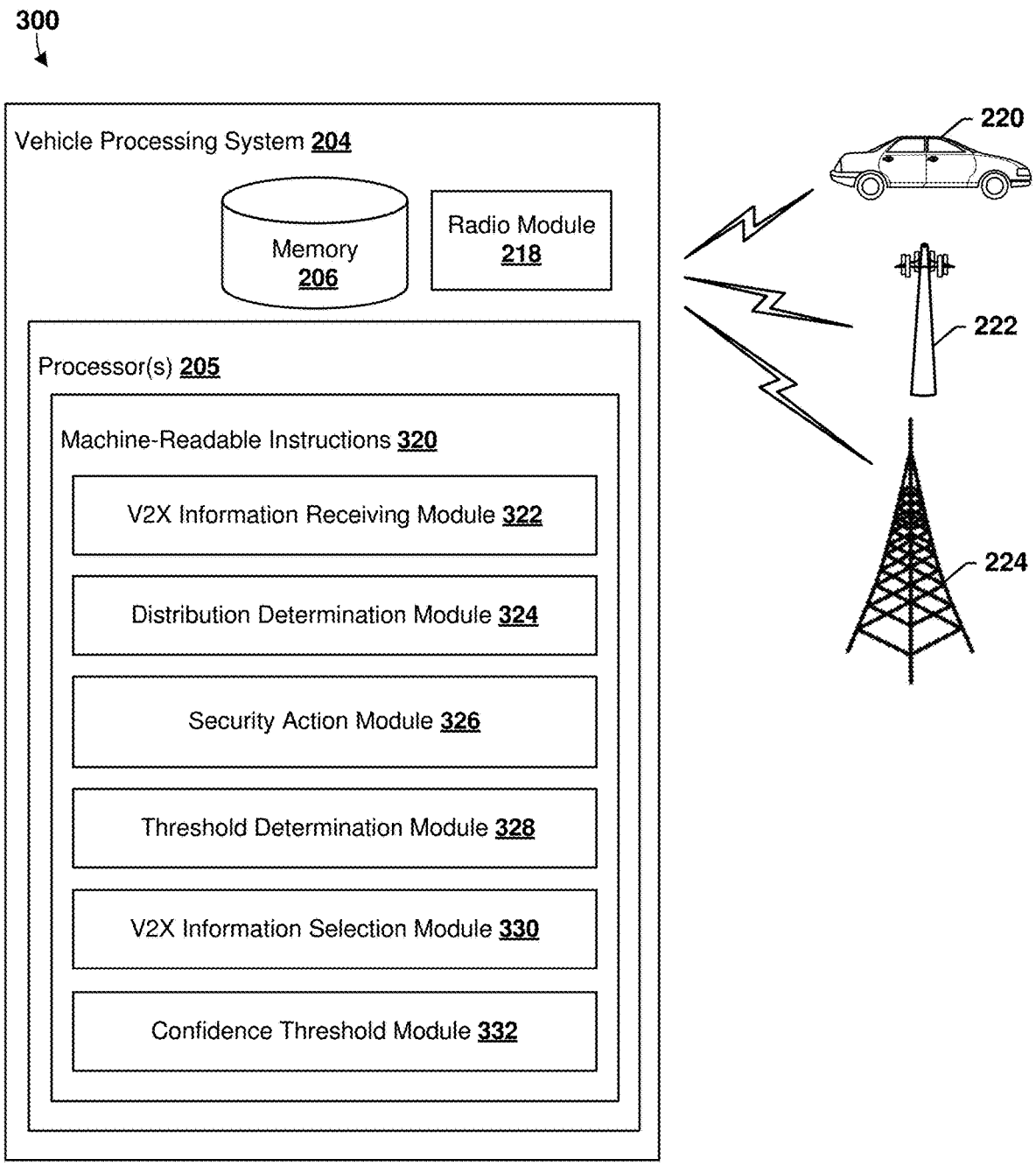
FIG. 3 is a component block diagram illustrating a system configured to perform operations for misbehavior detection in accordance with various embodiments

FIG. 3 is a component block diagram illustrating a system 300 configured to perform operations for misbehavior detection in accordance with various embodiments. With reference to FIGS. 1A-3, the system 300 may include a vehicle processing system 204, vehicle 220, roadside unit 222, and/or base station.

The vehicle processing system 204 may include one or more processors 205, memory 206, a radio module 218), and other components. The vehicle processing system 204 may include a plurality of hardware, software, and/or firmware components operating together to provide the functionality attributed herein to the processor 205.

Memory 206 may include non-transitory storage media that electronically stores information. The electronic storage media of memory 206 may include one or both of system storage that is provided integrally (i.e., substantially non-removable) with the vehicle processing system 204 and/or removable storage that is removably connectable to the vehicle processing system 204 via, for example, a port (e.g., a universal serial bus (USB) port, a firewire port, etc.) or a drive (e.g., a disk drive, etc.). In various embodiments, memory 206 may include one or more of electrical charge-based storage media (e.g., EEPROM, RAM, etc.), solid-state storage media (e.g., flash drive, etc.), optically readable storage media (e.g., optical disks, etc.), magnetically readable storage media (e.g., magnetic tape, magnetic hard drive, floppy drive, etc.), and/or other electronically readable storage media. Memory 206 may include one or more virtual storage resources (e.g., cloud storage, a virtual private network, and/or other virtual storage resources). Memory 206 may store software algorithms, information determined by processor(s) 205, information received from the vehicle 220, information received from the roadside unit 222, information received from the base station 224, and/or other information that enables the vehicle processing system 204 to function as described herein.

Processor(s) 205 may include one of more local processors that may be configured to provide information processing capabilities in the vehicle processing system 204. As such, processor(s) 205 may include one or more of a digital processor, an analog processor, a digital circuit designed to process information, an analog circuit designed to process information, a state machine, and/or other mechanisms for electronically processing information. Although the processor(s) 205 is shown in FIG. 3 as a single entity, this is for illustrative purposes only. In some embodiments, processor(s) 205 may include a plurality of processing units. These processing units may be physically located within the same device, or processor(s) 205 may represent processing functionality of a plurality of devices operating in coordination.

The vehicle processing system 204 may be configured by machine-readable instructions 320, which may include one or more instruction modules. The instruction modules may include computer program modules. In various embodiments, the instruction modules may include one or more of a V2X information receiving module 322, a distribution determination module 324, a security action module 326, a threshold determination module 328, a V2X information selection module 330, a confidence threshold module 332, and/or other modules.

The V2X information receiving module 322 may be configured to receive first V2X node information from a first vehicle, and to receive second V2X information from neighbor vehicles of the first vehicle. The V2X information receiving module 322 may be configured to receive from a roadside unit (RSU) information about neighbor vehicles that do not transmit V2X information.

The distribution determination module 324 may be configured to determine a distribution of information in the second V2X information. The distribution determination module 324 may be configured to determine a respective distribution of information from each of a plurality of fields in the second V2X information. The distribution determination module 324 may be configured to determine the distribution of information in selected second V2X information. The distribution determination module 324 may be configured to include the information about neighbor vehicles received from the RSU in the second V2X information to determine a distribution of a combination of information in the second V2X information and information about neighbor vehicles received from the RSU. The distribution determination module 324 may be configured to dynamically determine the confidence threshold of the distribution for the at least one field based on one or more of a variance among the first V2X information and the second V2X information for the at least one field, the threshold distance from the first vehicle, or a value of a time threshold.

The security action module 326 may be configured to determine whether information in the first V2X information is outside a confidence threshold of the distribution of information in the second V2X information. The security action module 326 may be configured to perform a security action in response to determining that information in the first V2X information is outside a confidence threshold of the distribution of information in the second V2X information. The security action module 326 may be configured to perform a security action in response to information in the plurality of fields of the first V2X information is outside a confidence threshold of respective distributions of information in the second V2X information. The security action module 326 may be configured to perform a security action in response to determining that information in at least one field in the first V2X information is outside a confidence threshold of the distribution for a corresponding at least one field and that a value of the confidence threshold meets a confidence reliability threshold The threshold determination module 328 may be configured to determine or select a distance threshold for a distance from the first vehicle. The threshold determination module 328 may be configured to adjust the threshold distance used in selecting information received from neighbor vehicles to include a threshold number of neighbor vehicles. The threshold determination module 328 may be configured to determine or select a time threshold. The threshold determination module 328 may be configured to determine or select the time threshold based on one or more of traffic density or traffic speed.

The V2X information selection module 330 may be configured to select information received from neighbor vehicles. The plurality of fields in the second V2X information each may include kinematic values for each of the respective vehicles. The V2X information selection module 330 may be configured to select information from each of a plurality of fields in the second V2X information. In some embodiments, the V2X information selection module 330 may be configured to select information received from neighbor vehicles that meets a time threshold.

The V2X information selection module 330 may be configured to select information received from neighbor vehicles that are within a threshold distance from the first vehicle. The V2X information selection module 330 may be configured to select information received from neighbor vehicles based on headings of the neighbor vehicles.

The confidence threshold module 332 may be configured to determine the confidence threshold of one or more distributions of information and the second V2X information. The confidence threshold module 332 may be configured to determine a confidence reliability threshold. The confidence threshold module 332 may be configured to determine whether a value of the confidence threshold meets the confidence reliability threshold.

The processor(s) 205 may be configured to execute the modules 322-332 and/or other modules by software, hardware, firmware, some combination of software, hardware, and/or firmware, and/or other mechanisms for configuring processing capabilities on processor(s) 205.

The description of the functionality provided by the different modules 322-332 is for illustrative purposes, and is not intended to be limiting, as any of modules 322-332 may provide more or less functionality than is described. For example, one or more of modules 322-332 may be eliminated, and some or all of its functionality may be provided by other ones of modules 322-332. As another example, processor(s) 205 may be configured to execute one or more additional modules that may perform some or all of the functionality attributed below to one of modules 322-332.

Figure 4A:
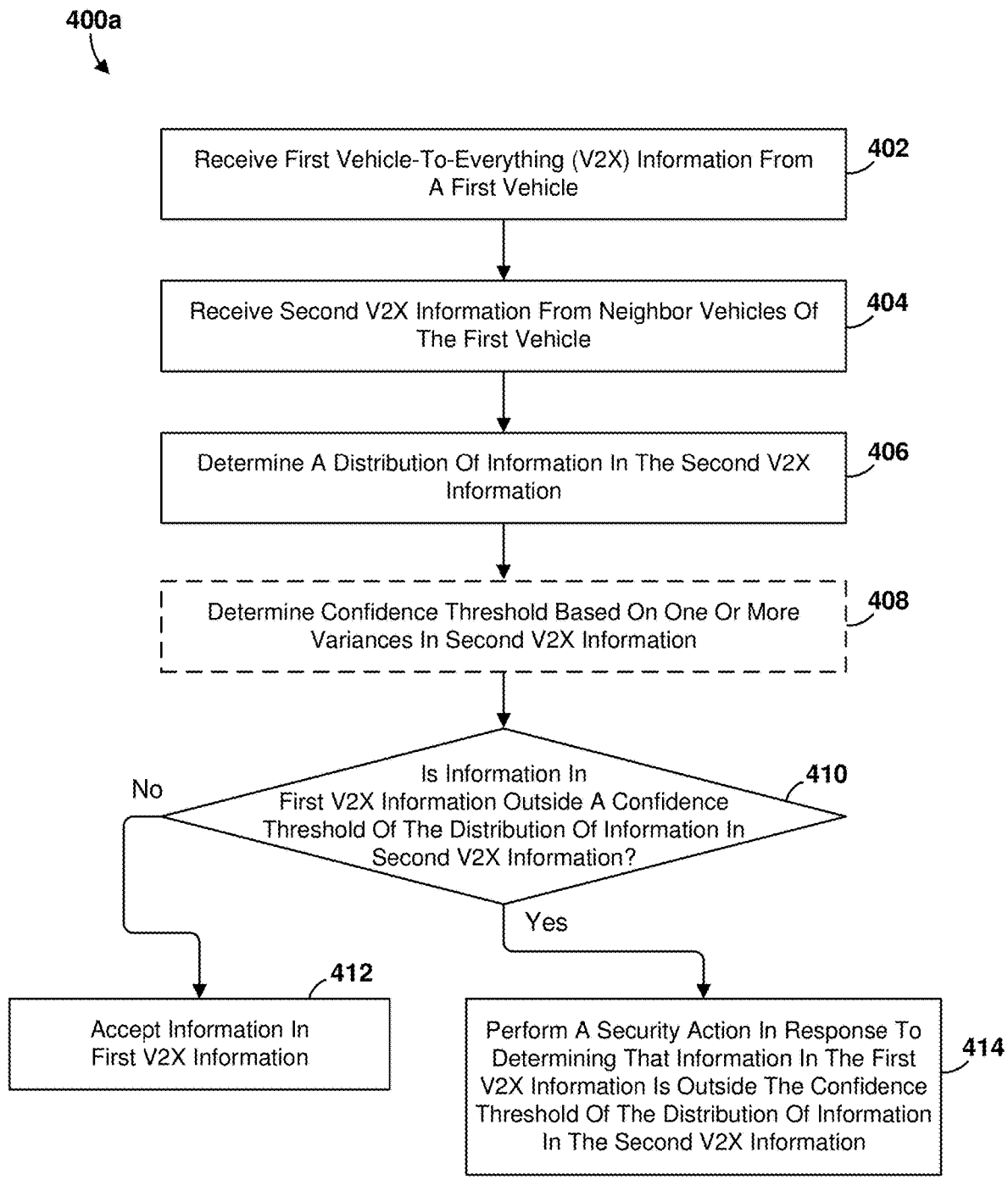
FIG. 4A is a process flow diagram of an example method for misbehavior detection in accordance with various embodiments.
Figure 4B:
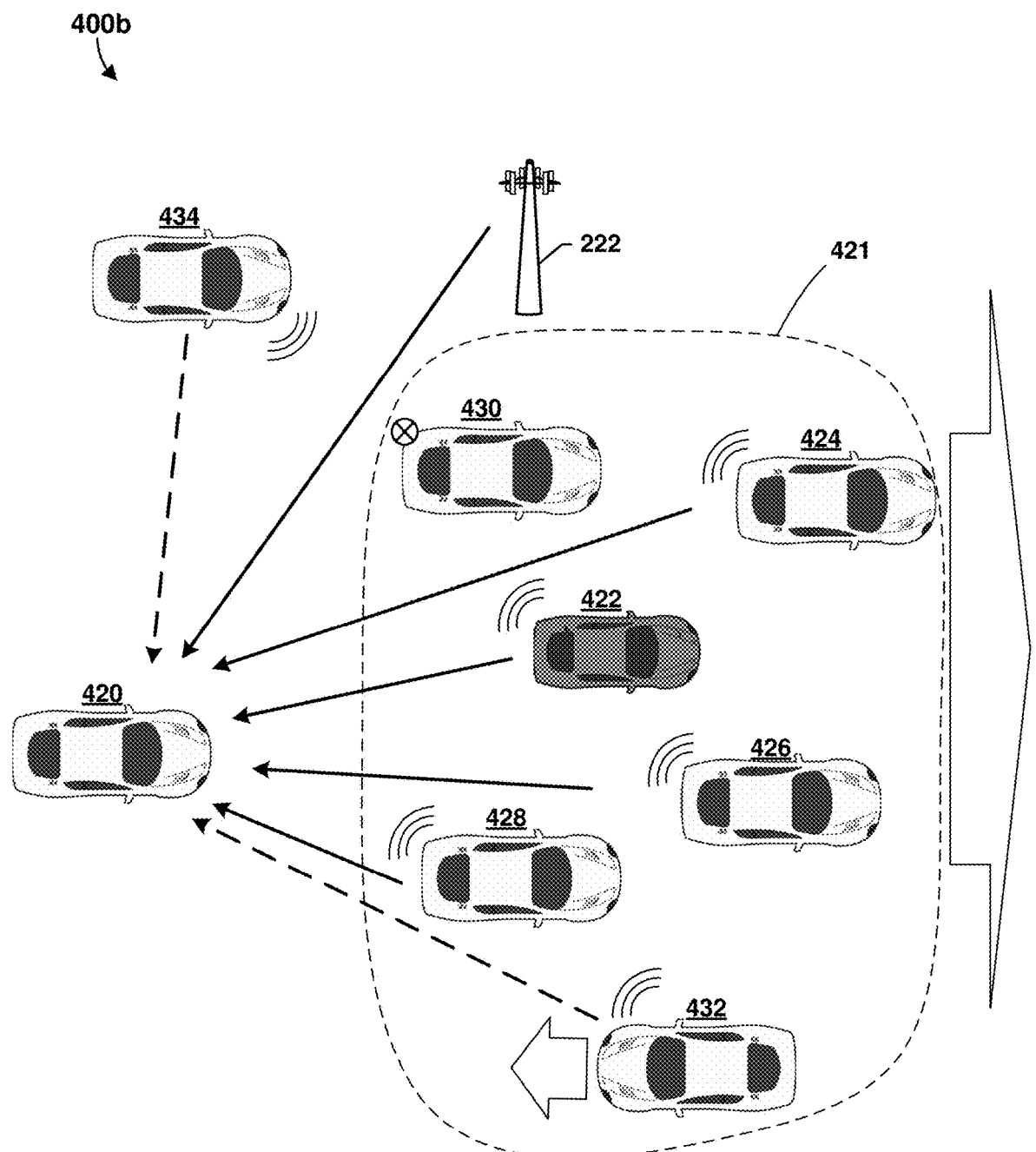
FIG. 4B is a conceptual diagram 400b illustrating aspects of the method for misbehavior detection in accordance with some embodiments.

FIG. 4A is a process flow diagram of an example method 400a for misbehavior detection in accordance with various embodiments. FIG. 4B is a conceptual diagram 400b illustrating aspects of the method 400a for misbehavior detection in accordance with various embodiments. With reference to FIGS. 1A-4B, the operations of the method 400a may be performed by a vehicle processing system or vehicle processor or V2X processing device (such as the vehicle processing system 102, 104, 106, 204) that may be implemented in hardware elements, software elements, or a combination of hardware and software elements (referred to collectively as a "vehicle processing system").

In block 402, the vehicle processing system may receive first V2X information from a first vehicle. For example, the vehicle processing system of a vehicle 420 may receive first V2X information from a first vehicle 422. Means for performing the operations of block 402 may include the vehicle processing system 102, 104, 106, 204, the in-vehicle network 210, the radio module 218, the processor(s) 205, and the V2X information receiving module 322.

In block 404, the vehicle processing system may receive the second V2X information from neighbor vehicles of the first vehicle. For example, the vehicle processing system of the vehicle 420 may receive second V2X information from one or more neighbor vehicles of the first vehicle 422, such as one or more of vehicles 424, 426, 428, and 434. In some embodiments, the vehicle processing system also may receive V2X information about vehicle 430 from the roadside unit 222, even though the vehicle 430 does not transmit V2X information. In some embodiments, the roadside unit 222 may receive information about the vehicle 430 (e.g., kinematic information, etc.) from another vehicle that is V2X-enabled, for example vehicle 424. In some embodiments, the vehicle processing system also may receive V2X information from vehicle 432; handling of V2X information received from vehicle 432 in some embodiments is further described below. Means for performing the operations of block 404 may include the vehicle processing system 102, 104, 106, 204, the in-vehicle network 210, the radio module 218, the processor(s) 205, and the V2X information receiving module 322.

In block 406, the vehicle processing system may determine a distribution of information in the second V2X information. In some embodiments, the vehicle processing system may determine a respective distribution of information from each of a plurality of fields in the second V2X information (i.e., a different or separate distribution for each field). In various embodiments, the plurality of fields in the second V2X information each may include kinematic values for each of the respective vehicles. For example, the second V2X information from the vehicles 424-434 may include a "speed" field that includes a value representing a speed of each respective vehicle 424-434; a "direction" or "heading" field that includes a value representing a direction or heading of each respective vehicle 424-434; an "acceleration" field that includes a value representing whether each respective vehicle 424-434 is accelerating and/or a degree or amount of acceleration; a "yaw rate" field that includes a value representing a degree of yaw experienced by each vehicle 424-434; and/or other fields representing other kinematic values for each of the respective vehicles 424-434. Means for performing the operations of block 404 may include the vehicle processing system 102, 104, 106, 204, the in-vehicle network 210, the processor(s) 205, and the distribution determination module 324.

In the following, a "speed" field (which is a kinematic field) is used as an example of determining a distribution of information in the second V2X information. Using the second V2X information received from neighbor vehicles of the first vehicle (e.g., in the operations of block 404), the vehicle processing system may calculate a mean and a standard deviation from the values of the speed kinematic field in the second V2X information. In some embodiments, the mean may be represented as:

$$\bar{v} = \frac{\sum_{i=1}^{n} v_i}{n}$$

where v represents speed from neighbor vehicle i (e.g., $v_1$, $v_2$, etc.), and n represents a total number of neighbor vehicles. In some embodiments, the standard deviation $\sigma$ may be represented as:

$$\sigma = \frac{1}{n} \sum_{i=1}^{n} (v_i - \bar{v})^2.$$

In some embodiments, the vehicle processing system may determine a normal distribution of the speed field by the values of the mean and standard deviation.

In optional block 408, the vehicle processing system may determine a confidence threshold based on one or more variances in the second V2X information. In some embodiments, the vehicle processing system may determine the confidence threshold based on a degree or amount of variance among the second V2X information received from the vehicles 424, 426, 428, 430. In some embodiments, the vehicle processing system may determine the confidence threshold as a range, which may be represented as $-\bar{v}*2\sigma$ to $\bar{v}*2\sigma$.

In some embodiments, the greater the degree of variance among the second V2X information, the lower confidence threshold determined by the vehicle processing system. In some embodiments, the vehicle processing system may determine the confidence threshold based on a size of a threshold distance from the first vehicle 422 that without vehicle processing system may use to determine whether to use certain second V2X information, as further described below. In some embodiments, the greater the threshold distance increases, the lower the confidence level determined by the vehicle processing system. In some embodiments, the vehicle processing system may determine the confidence threshold based on a length of a time threshold that the processing system may use to select relevant second V2X information (as further described below). In some embodiments, the longer the time threshold, the lower the confidence level determined by the vehicle processing system. In various embodiments, the vehicle processing system may use some or all of the above-described criteria, and/or other criteria, to determine the confidence threshold.

In determination block 410, the vehicle processing system may determine whether information in the first V2X information is outside a confidence threshold of the distribution of information in the second V2X information. Means for performing the operations of determination block 410 may include the vehicle processing system 102, 104, 106, 204, the in-vehicle network 210, the processor(s) 205, and the distribution determination module 324. As noted above, in some embodiments, the vehicle processing system may determine the confidence threshold as a range, which may be represented as $-\bar{v}*2\sigma$ to $\bar{v}*2\sigma$. In some embodiments, the vehicle processing system may determine that a value (e.g. a speed value) that is beyond or outside the threshold, and on that basis indicate that the value is anomalous or suspicious, for example.

In response to determining that information in the first V2X information is not outside the confidence threshold of the distribution of information in the second V2X information (i.e., determination block 410="No"), the vehicle processing system may accept the information in the first the V2X information in block 412. Means for performing the operations of block 412 may include the vehicle processing system 102, 104, 106, 204, the in-vehicle network 210, the processor(s) 205, and the security action module 326.

In response to determining that information in the first V2X information is outside the confidence threshold of the distribution of information in the second V2X information (i.e., determination block 410="Yes"), the vehicle processing system may perform a security action in block 414. For example, the vehicle processing system may transmit a misbehavior report about the first vehicle to an ITS network element, such as a security server, or to a network element performing a similar or suitable function, to the roadside unit 222, and/or to one or more other vehicles 424-434. In some embodiments, the vehicle processing system may perform a security action in response to determining that information in the plurality of fields of the first V2X information is outside a confidence threshold of respective distributions of information in the second V2X information (e.g., respective distributions of information from fields of the V2X information). Means for performing the operations of block 414 may include the vehicle processing system 102, 104, 106, 204, the in-vehicle network 210, the radio module 218, the processor(s) 205, the security action module 326.

FIGS. 4C-4F are process flow diagrams of example operations 400c-400f that may be performed as part of the method 400a for misbehavior detection in accordance with various embodiments. The operations 400c-400f may be performed by a vehicle processing system or vehicle processor or V2X processing device (such as the vehicle processing system 102, 104, 106, 204) that may be implemented in hardware elements, software elements, or a combination of hardware and software elements (referred to collectively as a "vehicle processing system").

Figure 4C:
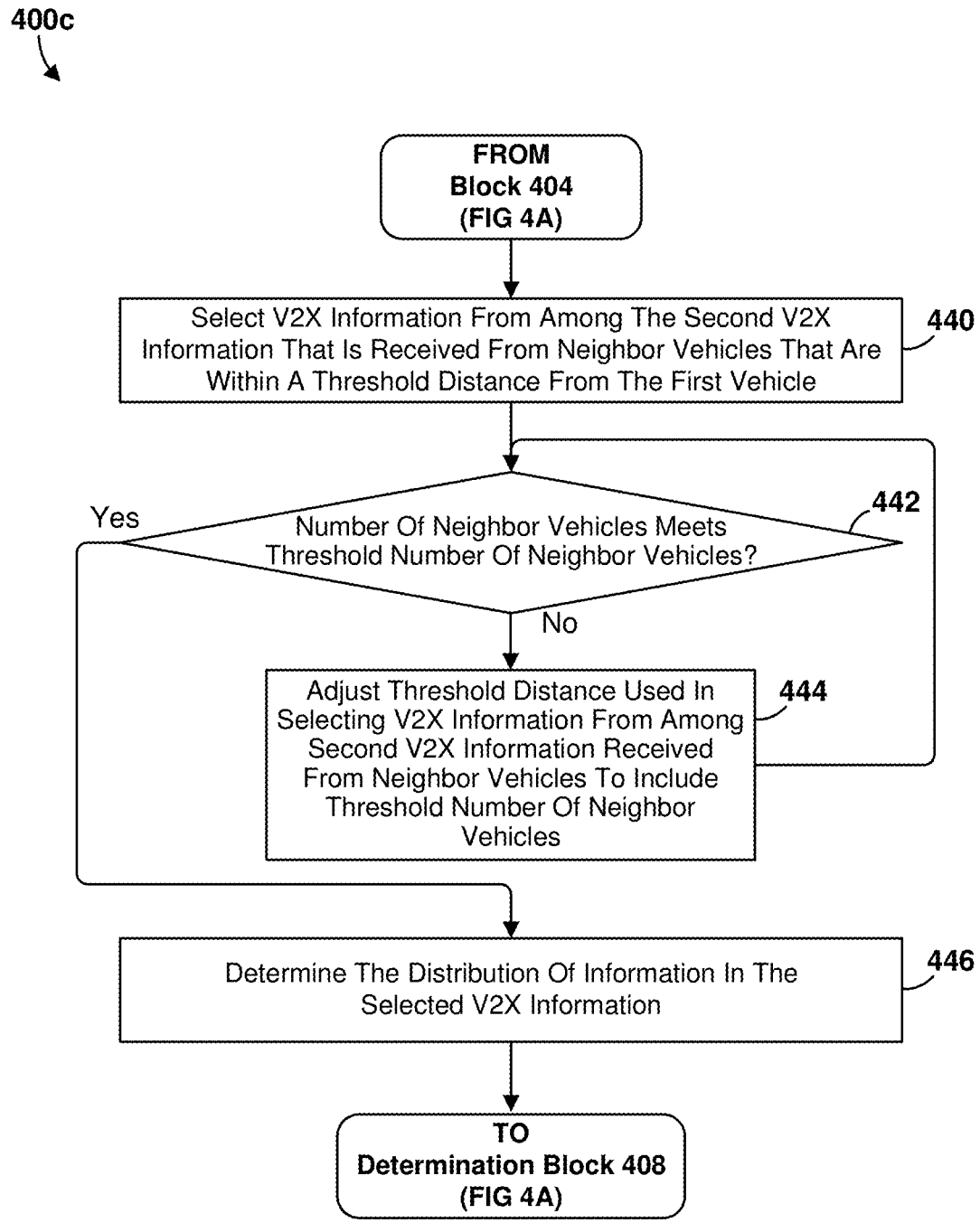
FIGS. 4C-4F are process flow diagrams of example operations that may be performed as part of the method for misbehavior detection illustrated in FIG. 4A in accordance with some embodiments.

FIG. 4C illustrates operations 400c that may be performed by the processing system in some embodiments. With reference to FIGS. 1A-4C, after receiving of second V2X information from neighbor vehicles of the first vehicle in block 404 (FIG. 4A) as described, the vehicle processing system may select V2X information from among the received second V2X information that is received from neighbor vehicles that are within a threshold distance from the first vehicle in block 440. For example, neighbor vehicles 424, 426, 420, and 430 may be within a threshold distance 421 from the first vehicle 422. The vehicle processing system may select V2X information that is received from neighbor vehicles 424, 426, 420, and 430 for use in determining the distribution of V2X information from the neighbor vehicles. In this manner, the vehicle processing system may select second V2X information that is relevant to verifying the first V2X information received from the first vehicle 422.

In some embodiments, the vehicle processing system may select V2X information from among the received second V2X information that is received from neighbor vehicles based on headings of the neighbor vehicles. In this manner, the vehicle processing system may select relevant V2X information to use in verifying the first V2X information. For example, vehicle 432 is within the threshold distance 421 from the first vehicle 422. However, the vehicle processing system may determine (e.g., based on the V2X information from the vehicle 432) that vehicle 432 is heading in or traveling in a substantially different direction than the first vehicle 422 and/or neighbor vehicles 424, 426, 420, and 430. For example, the vehicle 432 may be a vehicle among oncoming traffic, may be traveling in a direction substantially perpendicular to the first vehicle 422 and or neighbor vehicles 424, 426, 420, 430 (e.g., exiting or entering a roadway, approaching or moving away from an intersection, etc.), and so forth. In this example, the vehicle processing system may not select V2X information received from the vehicle 432 based on the heading of vehicle 432 (e.g., relative to the heading of the first vehicle 422). Means for performing the operations of block 440 may include the vehicle processing system 102, 104, 106, 204, the in-vehicle network 210, and the V2X information selection module 330.

In determination block 422 the vehicle processing system may determine whether a number of neighbor vehicles from which the second V2X information is received meets a threshold number of neighbor vehicles. For example, a sufficient amount of second V2X information is necessary for determining a useful distribution of the V2X information from the neighbor vehicles. Means for performing the operations of determination block 442 may include the vehicle processing system 102, 104, 106, 204, the in-vehicle network 210, and the distribution determination module 324.

In response to determining that the number of neighbor vehicles from which the second V2X information is received does not meet the threshold number of neighbor vehicles (i.e., determination block 442="No"), the vehicle processing system may adjust the threshold distance used in selecting V2X information from among the second V2X information received from neighbor vehicles to include the threshold number of neighbor vehicles in block 444. Means for performing the operations of determination block 444 may include the vehicle processing system 102, 104, 106, 204, the in-vehicle network 210, and the threshold determination module 328.

The vehicle processing system may then determine whether a number of neighbor vehicles from which the second V2X information is received meets a threshold number of neighbor vehicles in determination block 442 as described.

In response to determining that the number of neighbor vehicles from which the second V2X information is received meets the threshold number of neighbor vehicles (i.e., determination block 442="Yes"), the vehicle processing system may determine a distribution of the information in the selected V2X information in block 446. Means for performing the operations of determination block 446 may include the vehicle processing system 102, 104, 106, 204, the in-vehicle network 210, and the distribution determination module 324.

The vehicle processing system may then determine whether information in the first V2X information is outside a confidence threshold of the distribution of information in the second V2X information in determination block 408 as described.

Figure 4D:
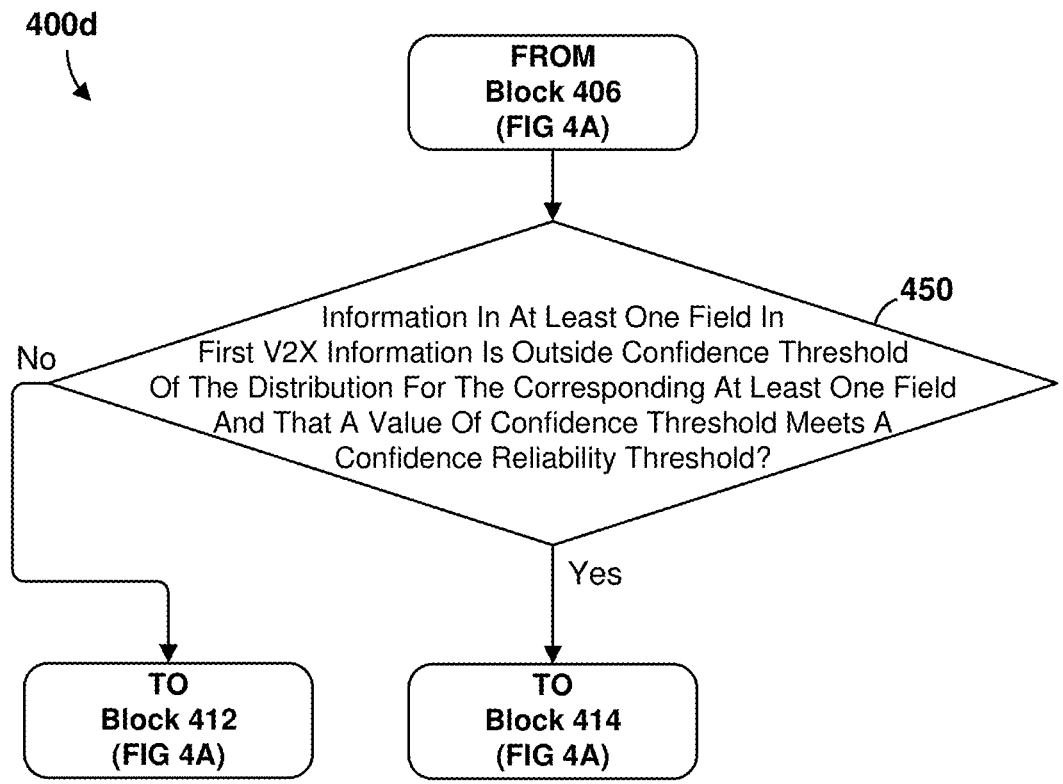

FIG. 4D illustrates operations 400d that may be performed by the processing system in some embodiments. With reference to FIGS. 1A-4D, after determining the distribution of information and the second V2X information in block 406 as described, the vehicle processing system may determine whether information in at least one field in the first V2X information is outside a confidence threshold of the distribution for the corresponding at least one field and that a value of the confidence threshold meets a confidence reliability threshold in determination block 450. As noted, in various embodiments, the vehicle processing system may determine a confidence threshold based on one or more variances in the second V2X information. In some embodiments, the vehicle processing system may determine whether the confidence threshold is below a level that may produce reliable V2X information (i.e., a "confidence reliability threshold"). Means for performing the operations of determination block 450 may include the vehicle processing system 102, 104, 106, 204, the in-vehicle network 210, and the confidence threshold module 332.

In response to determining that information in at least one field in the first V2X information is not outside a confidence threshold of the distribution for the corresponding at least one field and/or a value of the confidence threshold does not meet a confidence reliability threshold (i.e., determination block 450="No"), the vehicle processing system may accept the information in the first the V2X information in block 412 as described.

In response to determining that information in at least one field in the first V2X information is outside a confidence threshold of the distribution for the corresponding at least one field and a value of the confidence threshold meets the confidence reliability threshold (i.e., determination block 450="Yes"), the vehicle processing system may perform a security action in block 414 as described.

Figure 4E:
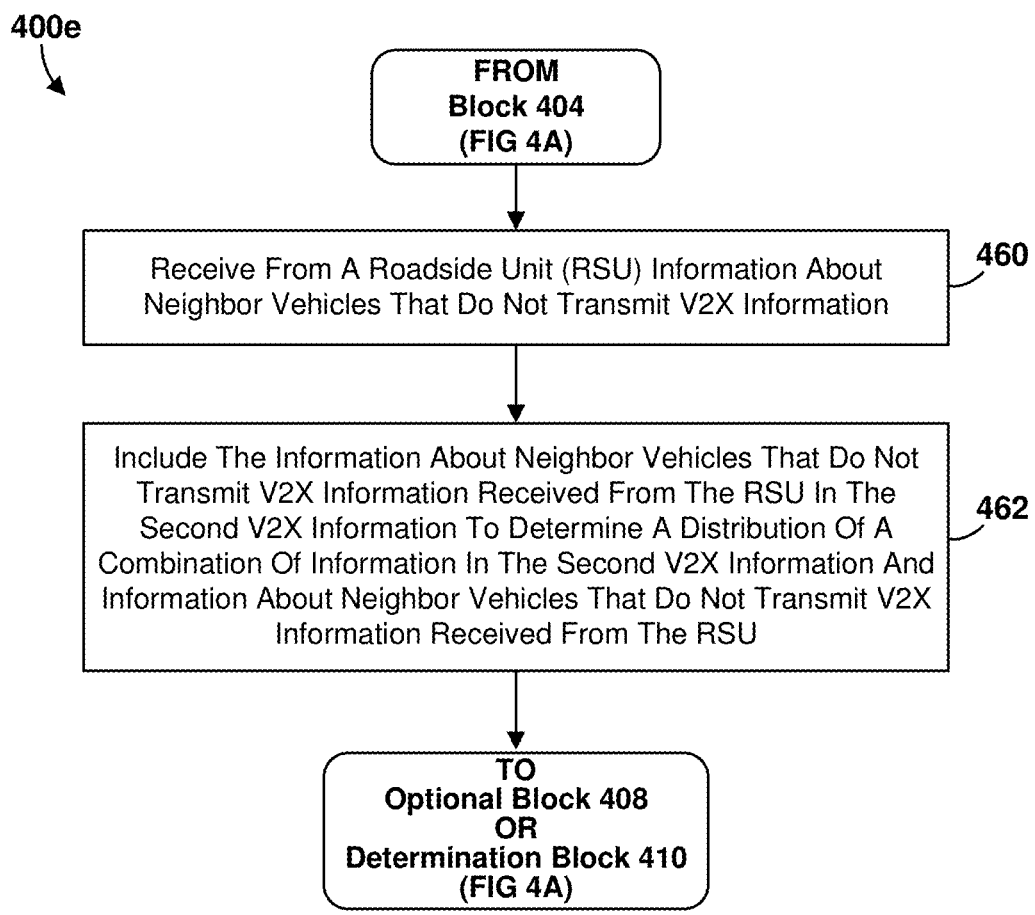

FIG. 4E illustrates operations 400e that may be performed by the processing system in some embodiments. With reference to FIGS. 1A-4E, after receiving of second V2X information from neighbor vehicles of the first vehicle in block 404 as described, the vehicle processing system may receive from a roadside unit (RSU) information about neighbor vehicles that do not transmit V2X information in block 460. For example, the vehicle processing system of vehicle 420 may receive from the roadside unit 222 information about the vehicle 430. The vehicle 430 does not transmit V2X information (e.g., vehicle 430 is not equipped to transmit V2X information). However, another vehicle that is configured to transmit V2X information, such as any of vehicles 424, 426, 428, 434, etc. may transmit V2X information about the vehicle 430 to the roadside unit 222. For example, any of vehicles 424, 426, 428, 434 may detect speed, direction, acceleration, braking, or any other kinematic information about the vehicle 430 using one or more vehicle sensors, and may transmit such information to the roadside unit 222. The roadside unit 222 may transmit the V2X information about the vehicle 430 to the vehicle 420. Means for performing the operations of block 460 may include the vehicle processing system 102, 104, 106, 204, the in-vehicle network 210, the radio module 218, and the V2X information receiving module 322.

In block 462, the vehicle processing system may include the information about neighbor vehicles that do not transmit V2X information received from the RSU in the second V2X information to determine a distribution of a combination of information in the second V2X information and information about neighbor vehicles that do not transmit V2X information received from the RSU. Means for performing the operations of block 462 may include the vehicle processing system 102, 104, 106, 204, the in-vehicle network 210, and the distribution determination module 324.

The vehicle processing system may then may determine a confidence threshold based on one or more variances in the second V2X information. in optional block 408, or may determine whether information in the first V2X information is outside a confidence threshold of the distribution of information in the second V2X information in determination block 410 as described.

Figure 4F:
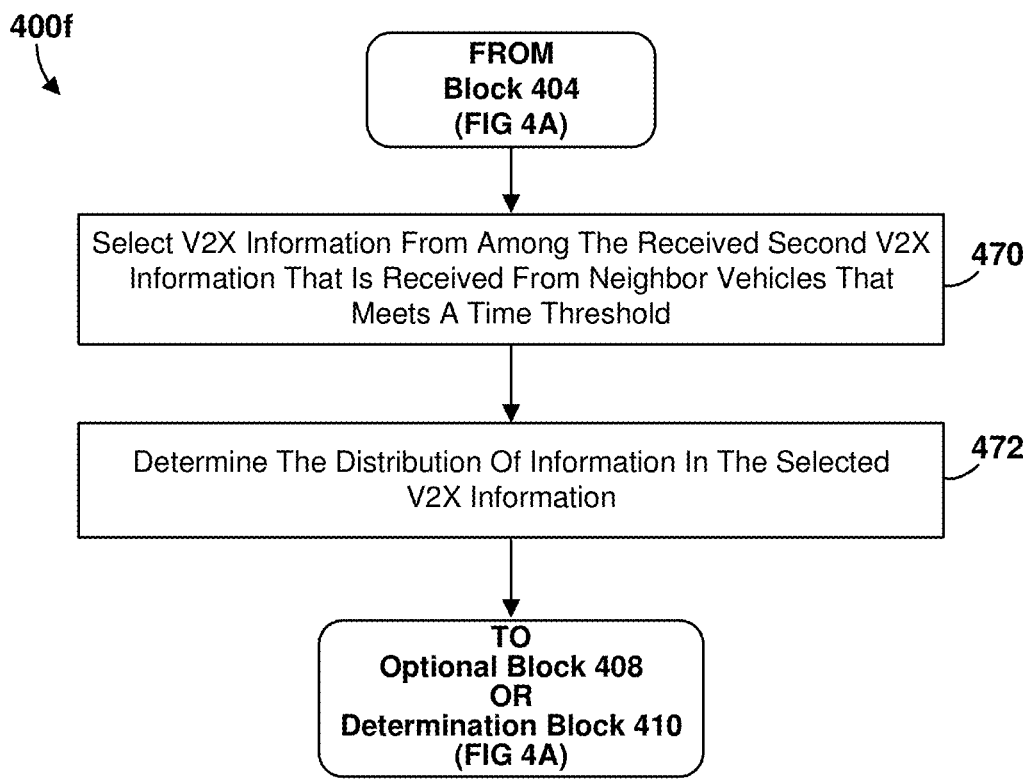

FIG. 4F illustrates operations 400f that may be performed by the processing system in some embodiments. With reference to FIGS. 1A-4F, after receiving of second V2X information from neighbor vehicles of the first vehicle in block 404 as described, the vehicle processing system may select V2X information from among the received second V2X information that is received from neighbor vehicles that meets a time threshold in block 470. In some embodiments, the vehicle processing system may select (or adjust) a time threshold to include V2X information from neighbor vehicles that is accurate and relevant to the evaluation of the V2X information from the first vehicle, while not consuming unnecessary processing resources by processing a superfluous amount of V2X information. In some embodiments, the vehicle processing system may select (or adjust) the time threshold based on one or more of traffic density or traffic speed. For example, in densely packed traffic, a relatively shorter time period may enable the vehicle processing system to obtain a sufficient amount of accurate and relevant V2X information, while in sparser traffic a relatively longer time period may be required to enable the vehicle processing system to obtain sufficient V2X information. As another example, if traffic is relatively slow-moving, such as bumper-to-bumper traffic, a relatively longer time period may be required to enable the vehicle processing system to obtain a sufficient amount of accurate and relevant V2X information. Means for performing the operations of block 470 may include the vehicle processing system 102, 104, 106, 204, the in-vehicle network 210, and the threshold determination module 328.

In block 472, the vehicle processing system may determine the distribution of information in the selected V2X information. In some embodiments, the operations of block 472 may be similar to those operations described above performed with regard to block 406. Means for performing the operations of block 470 may include the vehicle processing system 102, 104, 106, 204, the in-vehicle network 210, and the distribution determination module 324.

The vehicle processing system may then may determine a confidence threshold based on one or more variances in the second V2X information. in optional block 408, or may determine whether information in the first V2X information is outside a confidence threshold of the distribution of information in the second V2X information in determination block 410 as described.

Implementation examples are described in the following paragraphs. While some of the following implementation examples are described in terms of example methods, further example implementations may include: the example methods discussed in the following paragraphs implemented by a vehicle processing device that may be an on-board unit, mobile device unit, mobile computing unit, or stationary roadside unit including a processor configured with processor-executable instructions to perform operations of the methods of the following implementation examples; the example methods discussed in the following paragraphs implemented by a vehicle processing device including means for performing functions of the methods of the following implementation examples; and the example methods discussed in the following paragraphs may be implemented as a non-transitory processor-readable storage medium having stored thereon processor-executable instructions configured to cause a processor of a vehicle processing device to perform the operations of the methods of the following implementation examples.

Example 1. A method performed by a processor of a vehicle processing system for misbehavior detection, including receiving first vehicle-to-everything (V2X) information from a first vehicle, receiving second V2X information from neighbor vehicles of the first vehicle, determining a distribution of information in the second V2X information, and performing a security action in response to determining that information in the first V2X information is outside a confidence threshold of the distribution of information in the second V2X information.

Example 2. The method of example 1, further including selecting V2X information from among the second V2X information that is received from neighbor vehicles that are within a threshold distance from the first vehicle, in which determining the distribution of information in the second V2X information includes determining a distribution of information in the selected V2X information.

Example 3. The method of example 2, further including adjusting the threshold distance used in selecting V2X information from among the second V2X information received from neighbor vehicles to include a threshold number of neighbor vehicles.

Example 4. The method of example 2, in which selecting V2X information from among the received second V2X information that is received from neighbor vehicles that are within a threshold distance from the first vehicle includes selecting V2X information from among the second V2X information that is received from neighbor vehicles based on headings of the neighbor vehicles.

Example 5. The method of example 2, further including dynamically determining the confidence threshold of the distribution of information for at least one field based on one or more of a variance among the first V2X information and the second V2X information for at least one field, the threshold distance from the first vehicle, or a value of a time threshold.

Example 6. The method of any of examples 1-5, in which determining a distribution of information in the second V2X information includes determining a respective distribution of information from each of a plurality of fields in the second V2X information, and performing a security action in response to determining that information in the first V2X information is outside confidence threshold of the distribution of information in the second V2X information includes performing a security action in response to determining that information in the plurality of fields of the first V2X information is outside a confidence threshold of respective distributions of information in the second V2X information.

Example 7. The method of example 6, in which the plurality of fields in the second V2X information each includes kinematic values for each of the respective vehicles.

Example 8. The method of either of examples 6 or 7, in which performing a security action in response to information in the plurality of fields of the first V2X information is outside a confidence threshold of respective distributions of information in the second V2X information includes performing a security action in response to determining that information in at least one field in the first V2X information is outside a confidence threshold of the distribution of information for a corresponding at least one field and that a value of the confidence threshold meets a confidence reliability threshold.

Example 9. The method of any of examples 1-8, further including receiving from a roadside unit (RSU) information about neighbor vehicles that do not transmit V2X information, and including the information about neighbor vehicles that do not transmit V2X information received from the RSU in the second V2X information to determine a distribution of a combination of information in the second V2X information and information about neighbor vehicles received from the RSU.

Example 10. The method of any of examples 1-9, further including selecting V2X information from among the received second V2X information that is received from neighbor vehicles that meets a time threshold, in which determining the distribution of information in the second V2X information includes determining the distribution of information in the selected V2X information.

Example 11. The method of any of examples 1-10, further including selecting the time threshold based on one or more of traffic density or traffic speed.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (TCUASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of a vehicle processing system for misbehavior detection, comprising:
receiving first vehicle-to-everything (V2X) information from a first vehicle;
receiving second V2X information from neighbor vehicles of the first vehicle;
determining a distribution of information in the second V2X information;
performing a security action in response to determining that information in the first V2X information is outside a confidence threshold of the distribution of information in the second V2X information; and
selecting V2X information from among the second V2X information that is received from neighbor vehicles that are within a threshold distance from the first vehicle, wherein determining the distribution of information in the second V2X information comprises determining a distribution of information in the selected V2X information.

2. The method of claim 1, further comprising adjusting the threshold distance used in selecting V2X information from among the second V2X information received from neighbor vehicles to include a threshold number of neighbor vehicles.

3. The method of claim 1, wherein selecting V2X information from among the received second V2X information that is received from neighbor vehicles that are within a threshold distance from the first vehicle comprises selecting V2X information from among the second V2X information that is received from neighbor vehicles based on headings of the neighbor vehicles.

4. The method of claim 1, further comprising dynamically determining the confidence threshold of the distribution of information for at least one field based on one or more of a variance among the first V2X information and the second V2X information for at least one field, the threshold distance from the first vehicle, or a value of a time threshold.

5. The method of claim 1, wherein:
determining a distribution of information in the second V2X information comprises determining a respective distribution of information from each of a plurality of fields in the second V2X information; and
performing a security action in response to determining that information in the first V2X information is outside a confidence threshold of the distribution of information in the second V2X information comprises performing a security action in response to determining that information in the plurality of fields of the first V2X information is outside a confidence threshold of respective distributions of information in the second V2X information.

6. The method of claim 5, wherein the plurality of fields in the second V2X information each includes kinematic values for each of the respective vehicles.

7. The method of claim 5, wherein performing a security action in response to information in the plurality of fields of the first V2X information is outside a confidence threshold of respective distributions of information in the second V2X information comprises performing a security action in response to determining that information in at least one field in the first V2X information is outside a confidence threshold of the distribution of information for a corresponding at least one field and that a value of the confidence threshold meets a confidence reliability threshold.

8. The method of claim 1, further comprising:
receiving from a roadside unit (RSU) information about neighbor vehicles that do not transmit V2X information; and
including the information about neighbor vehicles that do not transmit V2X information received from the RSU in the second V2X information to determine a distribution of a combination of information in the second V2X information and information about neighbor vehicles received from the RSU.

9. The method of claim 1, further comprising selecting V2X information from among the received second V2X information that is received from neighbor vehicles that meets a time threshold, wherein determining the distribution of information in the second V2X information comprises determining the distribution of information in the selected V2X information.

10. A vehicle processing system, comprising:
a processor configured with processor executable instructions to:
receive first vehicle-to-everything (V2X) information from a first vehicle;
receive second V2X information from neighbor vehicles of the first vehicle;
determine a distribution of information in the second V2X information;
perform a security action in response to determining that information in the first V2X information is outside a confidence threshold of the distribution of information in the second V2X information; and
select V2X information from among the second V2X information that is received from neighbor vehicles that are within a threshold distance from the first vehicle, wherein the distribution of information is determined in the selected V2X information.

11. The vehicle processing system of claim 10, wherein the processor is further configured with processor executable instructions to adjust the threshold distance used in selecting V2X information from among the second V2X information received from neighbor vehicles to include a threshold number of neighbor vehicles.

12. The vehicle processing system of claim 10, wherein the processor is further configured with processor executable instructions to select V2X information from among the second V2X information that is received from neighbor vehicles based on headings of the neighbor vehicles.

13. The vehicle processing system of claim 10, wherein the processor is further configured with processor executable instructions to dynamically determine the confidence threshold of the distribution of information for at least one field based on one or more of a variance among the first V2X information and the second V2X information for at least one field, the threshold distance from the first vehicle, or a value of a time threshold.

14. The vehicle processing system of claim 10, wherein the processor is further configured with processor executable instructions to:
determine a respective distribution of information from each of a plurality of fields in the second V2X information; and
perform a security action in response to determining that information in the plurality of fields of the first V2X information is outside a confidence threshold of respective distributions of information in the second V2X information.

15. The vehicle processing system of claim 14, wherein the processor is further configured with processor executable instructions such that the plurality of fields in the second V2X information each includes kinematic values for each of the respective vehicles.

16. The vehicle processing system of claim 14, wherein the processor is further configured with processor executable instructions to perform a security action in response to determining that information in at least one field in the first V2X information is outside a confidence threshold of the distribution of information for a corresponding at least one field and that a value of the confidence threshold meets a confidence reliability threshold.

17. The vehicle processing system of claim 10, wherein the processor is further configured with processor executable instructions to:
receive from a roadside unit (RSU) information about neighbor vehicles that do not transmit V2X information; and
include the information about neighbor vehicles that do not transmit V2X information received from the RSU in the second V2X information to determine a distribution of a combination of information in the second V2X information and information about neighbor vehicles received from the RSU.

18. The vehicle processing system of claim 10, wherein the processor is further configured with processor executable instructions to:
select V2X information from among the received second V2X information that is received from neighbor vehicles that meets a time threshold; and
determine the distribution of information in the selected V2X information.

19. A non-transitory processor-readable medium having stored thereon processor-executable instruction configured to cause a processor of a vehicle processing system perform operations comprising:
receiving first vehicle-to-everything (V2X) information from a first vehicle;
receiving second V2X information from neighbor vehicles of the first vehicle;
determining a distribution of information in the second V2X information;
performing a security action in response to determining that information in the first V2X information is outside a confidence threshold of the distribution of information in the second V2X information; and
selecting V2X information from among the second V2X information that is received from neighbor vehicles that are within a threshold distance from the first vehicle, wherein determining the distribution of information in the second V2X information comprises determining a distribution of information in the selected V2X information.

20. A vehicle processing system, comprising:
means for receiving first vehicle-to-everything (V2X) information from a first vehicle;
means for receiving second V2X information from neighbor vehicles of the first vehicle;
means for determining a distribution of information in the second V2X information;
means for performing a security action in response to determining that information in the first V2X information is outside a confidence threshold of the distribution of information in the second V2X information; and
means for selecting V2X information from among the second V2X information that is received from neighbor vehicles that are within a threshold distance from the first vehicle, wherein means for determining the distribution of information in the second V2X information comprises means for determining a distribution of information in the selected V2X information.

21. The vehicle processing system of claim 20, further comprising means for adjusting the threshold distance used in selecting V2X information from among the second V2X information received from neighbor vehicles to include a threshold number of neighbor vehicles.

22. The vehicle processing system of claim 20, wherein means for selecting V2X information from among the received second V2X information that is received from neighbor vehicles that are within a threshold distance from the first vehicle comprises means for selecting V2X information from among the second V2X information that is received from neighbor vehicles based on headings of the neighbor vehicles.

23. The vehicle processing system of claim 20, further comprising means for dynamically determining the confidence threshold of the distribution of information for at least one field based on one or more of a variance among the first V2X information and the second V2X information for at least one field, the threshold distance from the first vehicle, or a value of a time threshold.

24. The vehicle processing system of claim 20, wherein:
means for determining a distribution of information in the second V2X information comprises means for determining a respective distribution of information from each of a plurality of fields in the second V2X information; and
means for performing a security action in response to determining that information in the first V2X information is outside a confidence threshold of the distribution of information in the second V2X information comprises means for performing a security action in response to determining that information in the plurality of fields of the first V2X information is outside a confidence threshold of respective distributions of information in the second V2X information.

25. The vehicle processing system of claim 24, wherein the plurality of fields in the second V2X information each includes kinematic values for each of the respective vehicles.

26. The vehicle processing system of claim 24, wherein means for performing a security action in response to information in the plurality of fields of the first V2X information is outside a confidence threshold of respective distributions of information in the second V2X information comprises means for performing a security action in response to determining that information in at least one field in the first V2X information is outside a confidence threshold of the distribution of information for a corresponding at least one field and that a value of the confidence threshold meets a confidence reliability threshold.

27. The vehicle processing system of claim 20, further comprising:
means for receiving from a roadside unit (RSU) information about neighbor vehicles that do not transmit V2X information; and
means for including the information about neighbor vehicles that do not transmit V2X information received from the RSU in the second V2X information to determine a distribution of a combination of information in the second V2X information and information about neighbor vehicles received from the RSU.

* * * * *